US010395096B2

(12) United States Patent
Shen et al.

(10) Patent No.: US 10,395,096 B2
(45) Date of Patent: Aug. 27, 2019

(54) DISPLAY METHOD FOR RECOMMENDING EYEBROW STYLE AND ELECTRONIC APPARATUS THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 15/871,125

(22) Filed: Jan. 15, 2018

(65) Prior Publication Data

US 2019/0065827 A1 Feb. 28, 2019

(30) Foreign Application Priority Data

Aug. 31, 2017 (CN) .......................... 2017 1 0768327

(51) Int. Cl.
*G06T 11/60* (2006.01)
*G06K 9/00* (2006.01)
(52) U.S. Cl.
CPC ..... *G06K 9/00248* (2013.01); *G06K 9/00275* (2013.01); *G06T 11/60* (2013.01); *G06T 2207/20221* (2013.01)
(58) Field of Classification Search
None
See application file for complete search history.

(56) References Cited

U.S. PATENT DOCUMENTS

| 8,115,774 | B2 * | 2/2012 | Biehn | G06T 13/40 345/473 |
| 8,624,904 | B1 * | 1/2014 | Koperwas | G06T 13/40 345/473 |
| 8,997,757 | B1 * | 4/2015 | Soare | A45D 26/00 132/200 |
| 9,589,340 | B2 | 3/2017 | Guerin | |

(Continued)

FOREIGN PATENT DOCUMENTS

| CN | 101339612 | 1/2009 |
| JP | 2000011144 | 1/2000 |

(Continued)

OTHER PUBLICATIONS

Wisuwat Sunhem et al., "An approach to face shape classification for hairstyle recommendation", 2016 Eighth International Conference on Advanced Computational Intelligence (ICACI), Feb. 14, 2016, pp. 390-394.

(Continued)

*Primary Examiner* — Robert J Craddock
(74) *Attorney, Agent, or Firm* — JCIPRNET

(57) ABSTRACT

A display method and an electronic apparatus for recommending an eyebrow style is provided. The method includes: obtaining an image; determining a shape of a human face in the image, obtaining a corresponding recommended eyebrow style according to the face type of the human face in the image; and displaying the recommended eyebrow style in eyebrow area of the human in the image. In this way, a user can clearly know an ideal eyebrow style corresponding to his/her face type.

18 Claims, 6 Drawing Sheets

(56) References Cited

U.S. PATENT DOCUMENTS

| | | | |
|---|---|---|---|
| 9,721,146 B1* | 8/2017 | Hayduke | G06T 11/60 |
| 2012/0177288 A1 | 7/2012 | Chaussat et al. | |
| 2013/0170766 A1* | 7/2013 | Xu | G06K 9/6202 |
| | | | 382/256 |
| 2015/0243015 A1 | 8/2015 | Guerin | |
| 2015/0254500 A1* | 9/2015 | Izumi | G06T 11/60 |
| | | | 348/78 |
| 2016/0063707 A1* | 3/2016 | Masumoto | G06T 11/20 |
| | | | 345/419 |
| 2016/0125229 A1* | 5/2016 | Soare | G06K 9/00248 |
| | | | 382/118 |

FOREIGN PATENT DOCUMENTS

| | | |
|---|---|---|
| JP | 2011152352 | 8/2011 |
| JP | 2013501292 | 1/2013 |
| WO | 2008102440 | 8/2008 |

OTHER PUBLICATIONS

"Search Report of Europe Counterpart Application", dated Nov. 9, 2018, p. 1-p. 4.

"Office Action of Japan Counterpart Application," dated Jun. 18, 2019, pp. 1-4.

* cited by examiner

DISPLAY METHOD FOR RECOMMENDING EYEBROW STYLE AND ELECTRONIC APPARATUS THEREOF

CROSS-REFERENCE TO RELATED APPLICATION

This application claims the priority benefit of Chinese application serial no. 201710768327.7, filed on Aug. 31, 2017. The entirety of the above-mentioned patent application is hereby incorporated by reference herein and made a part of this specification.

BACKGROUND

Field of the Invention

The invention relates to a display method for recommending an eyebrow style and an electronic apparatus thereof.

Description of Related Art

During a make-up process, most people usually "trim" eyebrows to make their eyebrow styles more suitable for their own face types. However, most people are unable to effectively and clearly know their own face types and thus, cannot obtain ideal eyebrow styles for themselves according to their own face types. Therefore, how to effectively and clearly know a face type of a person and a recommended eyebrow style corresponding thereto is one of the issues to be solved by those skilled in the art.

SUMMARY

The invention provides a display method for recommending an eyebrow style, by which a corresponding recommended eyebrow style may be displayed on an eyebrow area of a human face according to a face type of the human face in an image.

A display method for recommending an eyebrow style is provided. The display method includes: obtaining an image; determining a face type of a human face in the image; obtaining a corresponding recommended eyebrow style according to the face type of the human face in the image; and displaying the recommended eyebrow style in an eyebrow area of the human face in the image.

An electronic apparatus including a storage unit and a processing unit is provided. The storage unit is configured to store a plurality of modules. The processing unit is configured to access and execute the modules stored by the storage unit. The modules include an image obtaining module, a face type determination module, a recommended eyebrow style obtaining module and a display module. The image obtaining module obtains an image. The face type determination module determines a face type of a human face in the image. The recommended eyebrow style obtaining module obtains a corresponding recommended eyebrow style according to the face type of the human face in the image. The display module displays the recommended eyebrow style in an eyebrow area of the human face in the image.

Based on the above, in the display method for recommending the eyebrow style provided by the invention, the corresponding recommended eyebrow style can be displayed in the eyebrow area of the human face according to the face type of the human face in the image. Thereby, the user can clearly know the ideal eyebrow style corresponding to his/her face type and correspondingly trim the eyebrows according to the displayed image, so as to improve the efficiency and convenience during make-up.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
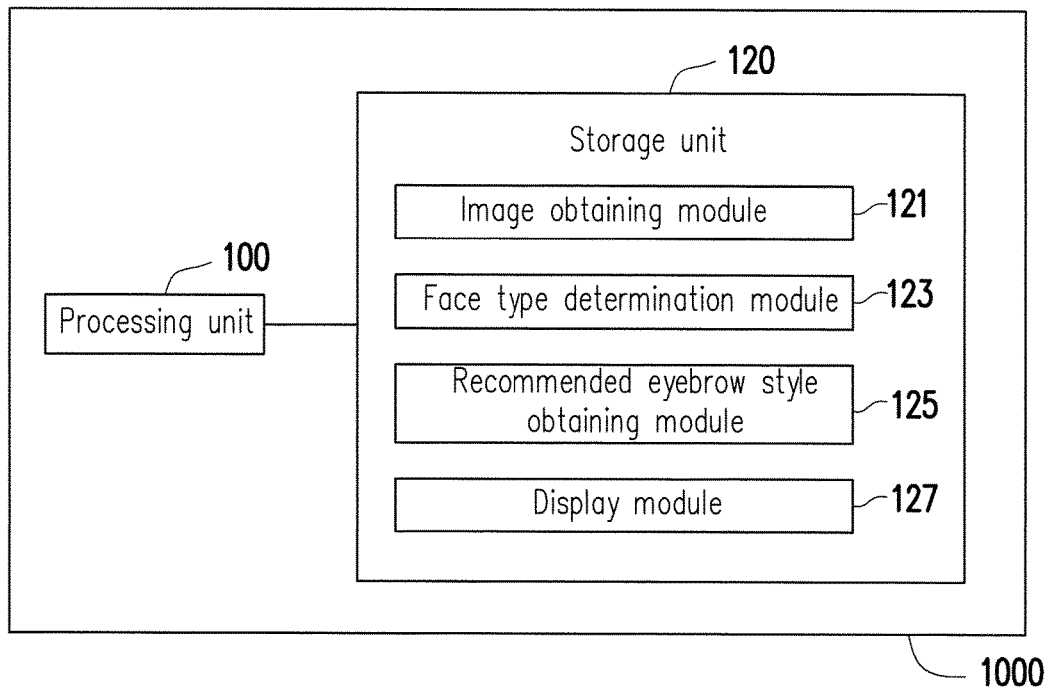
FIG. 1 is a schematic block diagram illustrating an electronic apparatus according to an embodiment of the invention.

FIG. 1 is a schematic block diagram illustrating an electronic apparatus according to an embodiment of the invention. Referring to FIG. 1, an electronic apparatus 1000 at least includes a processing unit 100 and a storage unit 120, and the processing unit 100 is coupled to the storage unit 120, but the invention is not limited thereto. In an embodiment of the invention, the electronic apparatus 1000 may be a server, a smart mobile apparatus, a desktop computer, a notebook computer, a workstation, a personal digital assistant (PDA) or the like, but the invention is not limited thereto.

The processing unit 100 may be a central processing unit (CPU), or other programmable general purpose or special purpose microprocessor, digital signal processor (DSP), programmable controller, application specific integrated circuit (ASIC) or other similar devices or a combination of the above devices.

The storage unit 120 may be any stationary or mobile random access memory (RAM), read-only memory (ROM), flash memory, similar devices or a combination of the aforementioned devices.

In the present exemplarily embodiment, the storage unit 120 of the electronic apparatus 1000 stores a plurality of programming code segments. The programming code segments, after being installed, are executed by the processing unit 100. For example, the storage unit 120 stores a plurality of modules including, for example, an image obtaining module 121, a face type determination module 123, a recommended eyebrow style obtaining module 125 and a display module 127. Various operations applicable to the electronic apparatus 1000 may be performed by these modules, and each module is composed of one or multiple program code segments. It should be noted that the storage unit 120 in the above described embodiment is not limited to a single memory device, and each of the modules may also be separately stored in two or more memory devices of the same type of different types. In other embodiments of the invention, the modules may further be respectively implemented by specific circuit structures, for example.

In an embodiment of the invention, the electronic apparatus 1000 further includes devices, such as input/output (I/O) interfaces (not shown) and communication interfaces (not shown), but the invention is not limited thereto. In detail, the I/O interfaces include a display, a speaker, a keyboard, a mouse and a touch panel used for outputting or inputting information or data. On the other hand, the communication interfaces comply with various wired communication standards and wireless communication stands, through which the electronic apparatus 1000 may be connected with other apparatuses.

A display method for recommending an eyebrow style provided by embodiments of the invention may be implemented in the electronic apparatus 1000 illustrated in FIG. 1. Several embodiments will be provided below to describe the method set forth above with reference to the electronic apparatus 1000 illustrated in FIG. 1. It should be noted that the display method for recommending the eyebrow style is not limited to be implemented in the electronic apparatus 1000, and other electronic apparatuses or systems with the corresponding capability may embody the aforementioned analysis method in the same way.

Figure 2:
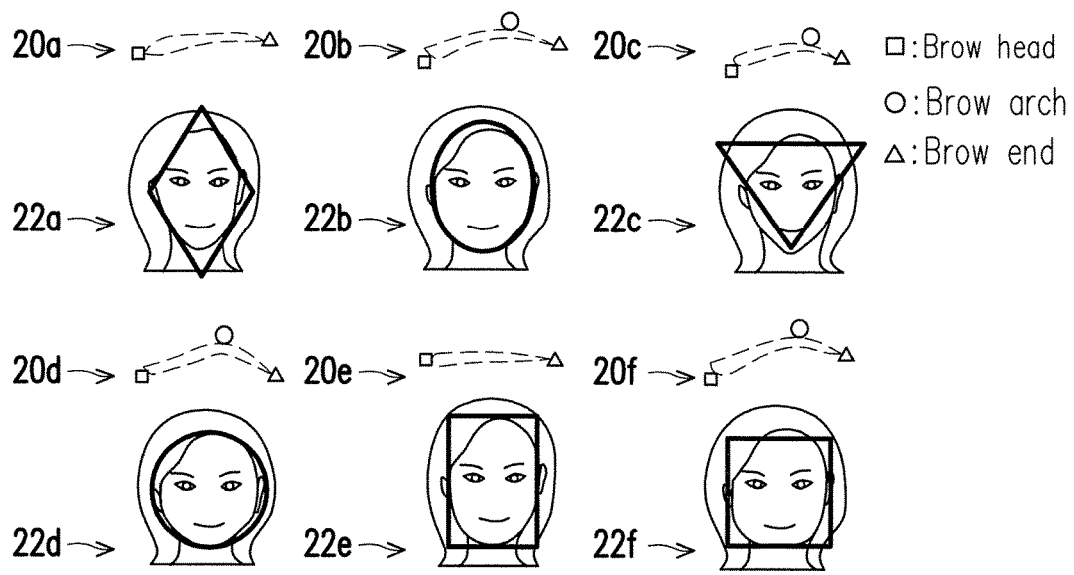
FIG. 2 is a schematic diagram illustrating corresponding relationships between face types and eyebrows according to an embodiment of the invention.

FIG. 2 is a schematic diagram illustrating corresponding relationships between face types and eyebrows according to an embodiment of the invention. Referring to FIG. 2, an eyebrow may be mainly divided into three feature points, i.e., a "brow head", a "brow arch" and a "brow end". The "brow head" refers to a feature point of the eyebrow which is the closet to the nose bridge and is represented by a square in FIG. 2. The "brow arch" represents the highest point of the curve of the eyebrow and is represented by a circle in FIG. 2. The "brow end" mainly refers to a feature point of the end of the eyebrow and is represented by a triangle in FIG. 2.

Generally, a face type may correspond to an ideal eyebrow style. For example, in FIG. 2, a shape of a human face 22a is a diamond shape, and an ideal eyebrow style corresponding thereto is a shape of an eyebrow 20a. The eyebrow 20a pertains to parallel lines, and a length of the eyebrow 20a slightly exceeds an eye end. Specially, in a scenario where the face type of the human face is a diamond shape, the eyebrows generally has to avoid obvious "brow arches". Therefore, the eyebrow 20a do not have a feature point of a brow arch. In another example, a shape of a human face 22b is an oval shape, and an ideal eyebrow style corresponding thereto is a shape of an eyebrow 20b. The eyebrow 20b pertains to an eyebrow in a standard shape, and a brow end of the eyebrow 20b is slightly higher than a brow head. In addition, eyebrow styles corresponding to various face types of a human face 22c to a human face 22f are illustrated as an eyebrow 20c to an eyebrow 20f, which are no longer repeatedly described. Specially, in a display method for recommending an eyebrow style of the invention, the eyebrow styles of the eyebrow 20a to the eyebrow 20f may be stored in advance in the storage unit 120, and after the electronic apparatus 1000 determines a shape of a human face in an output image, a corresponding eyebrow style are superposed and displayed on an eyebrow area of the human face in the output image, thereby achieving display in augmented reality (AR) and allowing a user to know a best matched eyebrow style for his/her own face type.

Figure 3:
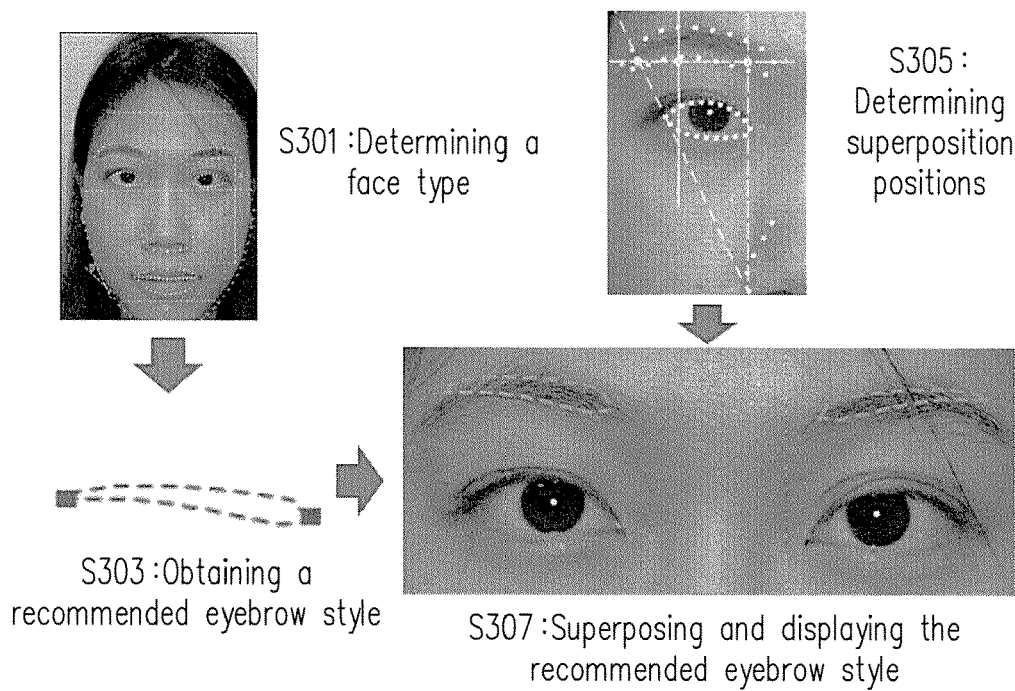
FIG. 3 is a flowchart illustrating a display method for recommending an eyebrow style according to an embodiment of the invention.

FIG. 3 is a flowchart illustrating a display method for recommending an eyebrow style according to an embodiment of the invention.

Referring to FIG. 3, in step S301, an image including a human face may be obtained by the image obtaining module 121, and a human face type in the image may be determined by the face type determination module 123.

Figure 4:
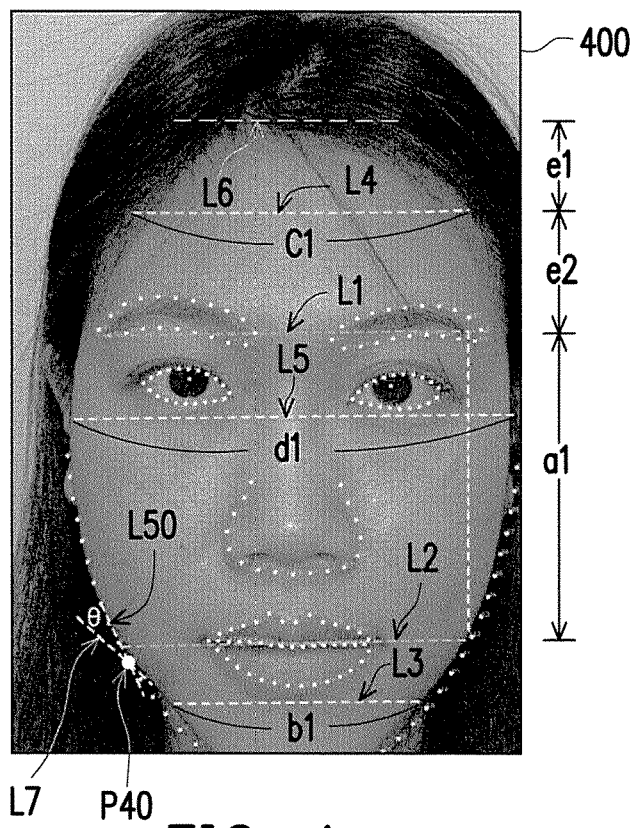
FIG. 4 is a schematic diagram of analyzing a human face in an image according to an embodiment of the invention.
Figure 5:
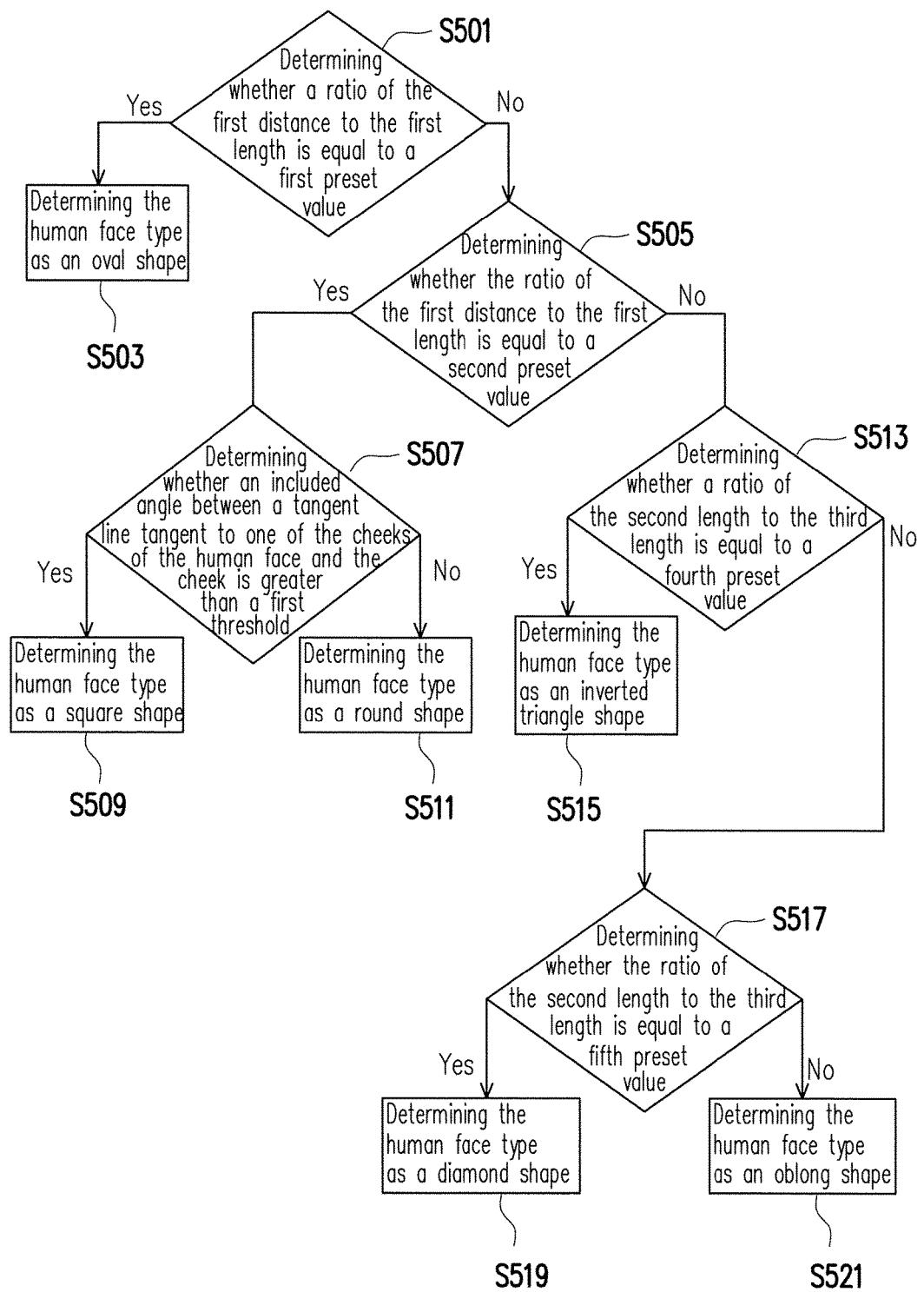
FIG. 5 is a flowchart of determining a face type of a human face according to an embodiment of the invention.

Specifically, FIG. 4 is a schematic diagram of analyzing a humanface in an image according to an embodiment of the invention. FIG. 5 is a flowchart of determining a face type of a human face according to an embodiment of the invention. Referring to FIG. 4 and FIG. 5 simultaneously, after the image obtaining module 121 obtains an image 400 including a human face, the face type determination module 123 may analyze the human face in the image 400 by using a plurality of auxiliary lines, thereby determining a face type of the human face in the image 400. Specifically, the face type determination module 123 defines an auxiliary line L1 (which is also referred to as a first auxiliary line), an auxiliary line L2 (which is also referred to as a second auxiliary line), an auxiliary line L3 (which is also referred to as a third auxiliary line), an auxiliary line L4 (which is also referred to as a fourth auxiliary line), an auxiliary line L5 (which is also referred to as a fifth auxiliary line), a hairline L6 and a tangent line L7 in the human face in the image 400.

The auxiliary line L1 is a horizontal line passing through brow ends of two eyebrows (which are collectively referred to as an eyebrow area) in the image 400. The auxiliary line L2 is a horizontal line passing through oral commissures of the human face in the image 400. The auxiliary line L3 is a horizontal line tangent to the lower lip of the human face in the image 400 and having two ends respectively terminating in the cheeks of two sides of the human face in the image 400. The auxiliary line L4 is a horizontal line with a distance e1 (which is also referred to as a second distance) to a hairline L6 of the human face in the image 400, a distance e2 (which is also referred to as a third distance) to the auxiliary line L1 and two ends respectively terminating in two sides of the forehead of the human face in the image 400. In the present exemplarily embodiment, a ratio of the distance e1 to the distance e2 is ½(which is also referred to as a third preset value). Namely, the ratio of the distance e1 to the distance e2 is 1:2. However, it should be noted that the invention is not intent to limit the ratio of the distance e1 to the distance e2.

The auxiliary line L5 (which is also referred to as a fifth auxiliary line) is a horizontal line tangent to lower edges of the eyes of the human face in the image 400 and having two ends respectively terminating in the cheeks of the two sides of the human face in the image 400. In addition, the face type determination module 123 further obtains an included angle θ between a tangent line L7 which is tangent to the cheek of one side of the human face in the image 400 and the cheek of the human face. The tangent line L7 and the included angle θ are substantially determined depending on a conjunction point P40 between the cheek and the jaw, where a facial feature may be correspondingly expressed thereby. To be specific, the tangent line L7 is substantially determined by the conjunction point P40 between the cheek and the lower jaw and is tangent to a jaw curve adjacent to the conjunction point P40. The included angle θ is determined by an angle included by the tangent line L7 and a tangent line L50 tangent to a cheek curve adjacent to the conjunction point P40 between the cheek and the jaw.

After defining the auxiliary lines L1 to L5, the hairline L6 and the tangent line L7, the face type determination module 123 may determine the face type of the human face in the image 400.

Referring to FIG. 5, in step S501 illustrated in FIG. 5, the face type determination module 123 calculates and obtains a distance a1 (which is also referred to as a first distance) between the auxiliary line L1 and the auxiliary line L2. The face type determination module 123 also calculates and obtains a length b1 (which is also referred to as a first length) of the auxiliary line L3. The face type determination module 123 determines a face type of the human face in the image 400 according to the distance a1 and the length b1.

When a ratio of the distance a1 to the length b1 is equal to a first preset value, in step S503, the face type determination module 123 determines that the face type of the human face in the image 400 is an oval shape. In the present exemplarily embodiment, a value of the first preset value is 1. However, the invention is not intent to limit the value of the first preset value.

However, when the ratio of the distance a1 to the length b1 is not equal to the first preset value, in step S505, the face type determination module 123 determines whether the ratio of the distance a1 to the length b1 is equal to a second preset value. In the present exemplarily embodiment, a value of the second preset value is ⅔. However, the invention is not intent to limit the value of the second preset value.

When the ratio of the distance a1 to the length b1 is equal to the second preset value, in step S507, the face type determination module 123 determines whether the included angle θ between the tangent line L7 which is tangent to the cheek of one side of the human face in the image 400 and the cheek is greater than a first threshold. In the present exemplarily embodiment, an angle of the first threshold is 45 degrees. However, the invention is not intent to limit the angle of the first threshold.

When the included angle θ between the tangent line L7 and the cheek is greater than the first threshold, in step S509, the face type determination module 123 determines that the face type of the human face in the image 400 is a square shape. When the included angle θ between the tangent line L7 and the cheek is not greater than the first threshold, in step S511, the face type determination module 123 determines that the face type of the human face in the image 400 is a round shape.

In addition, if the face type determination module 123, in step S505, determines that the ratio of the distance a1 to the length b1 is not equal to the second preset value, in step S513, the face type determination module 123 obtains a length c1 (which is also referred to as a second length) of the auxiliary line L4 and a length d1 (which is also referred to as a third length) of the auxiliary line L5 and determines whether a ratio of the length c1 to the length d1 is equal to a fourth preset value. In the present exemplarily embodiment, a value of the fourth preset value is 1. However, the invention is not intent to limit the value of the fourth preset value.

When the ratio of the length c1 to the length d1 is equal to the fourth preset value, in step S515, the face type determination module 123 determines that the face type of the human face in the image 400 is an inverted triangle shape.

However, if the face type determination module 123, in step S513, determines that the ratio of the length c1 to the length d1 is not equal to the fourth preset value, in step S517, the face type determination module 123 determines whether the ratio of the length c1 to the length d1 is equal to a fifth preset value. In the present exemplarily embodiment, a value of the fifth preset value is ⅔. However, the invention is not intent to limit the value of the fifth preset value.

When the ratio of the length c1 to the length d1 is equal to the fifth preset value, in step S519, the face type determination module 123 determines that the face type of the human face in the image 400 is a diamond shape. When the ratio of the length c1 to the length d1 is not equal to the fifth preset value, in step S521, the face type determination module 123 determines that the face type of the human face in the image 400 is an oblong shape.

According to the embodiments illustrated in FIG. 4 and FIG. 5, the face type determination module 123 may determine that the face type of the human face in the image 400 is an oval shape, a square shape, a round shape, an inverted triangle shape, a diamond shape or an oblong shape.

Then, referring to FIG. 3 again, after step S301 of determining the face type of the human face in the output image is completed, in step S303, the recommended eyebrow style obtaining module 125 may obtain a corresponding recommended eyebrow style according to the determined face type. In the meantime, in step S305, the display module 127 may determine positions in the image for superposing the recommended eyebrow style. Lastly, in step S307, the display module 127 may superpose and display the recommended eyebrow style on an eyebrow area in the image.

Figure 6A:
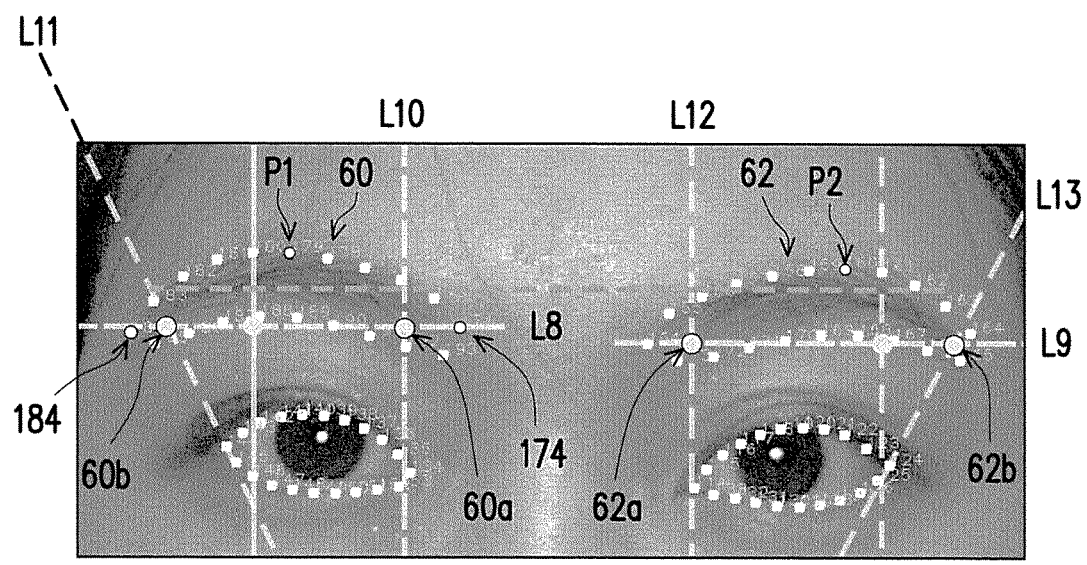
FIG. 6A and FIG. 6B are schematic diagrams of determining positions for superposing the recommended eyebrow style according to an embodiment of the invention.
Figure 6B:
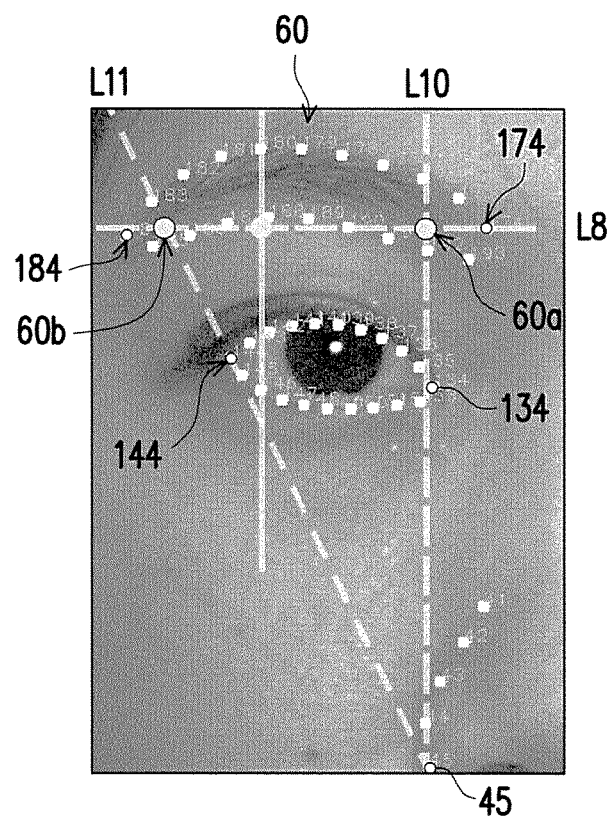

FIG. 6A and FIG. 6B are schematic diagrams of determining positions for superposing the recommended eyebrow style according to an embodiment of the invention.

Referring to FIG. 6A, in the step of determining the positions for superposing the recommended eyebrow style, the display module 127 first defines a plurality of reference points (which are also referred to as first reference points) around an eyebrow 60 of one side and defines a plurality of reference points (which are also referred to as second reference points) around an eyebrow 62 of the other side. Then, the display module 127 obtains a height (which is also referred to as a first height) from a reference point P1 (which is also referred to as a third reference point) among the first reference points to an auxiliary line L8 (which is also referred to as a sixth auxiliary line). The auxiliary line L8 is a horizontal line passing through a reference point 174, and a coordinate (which is referred to as a Y-coordinate) of the reference point P1 in a Y direction (which is also referred to as a first direction) is greater than Y-coordinates of the other reference points among the first reference points. Namely, the reference point P1 is the reference point having the highest position among the first reference points.

A method of obtaining a brow head 60a and a brow head 60b is additionally described herein. Referring to FIG. 6B, the display module 127 may define an auxiliary line L10 (which is also referred to as an eighth auxiliary line) passing through a nose ala 45 and a canthus 134 (which is also referred to as a first canthus) of one of the eyes of the human face. The display module 127 may also define an auxiliary line L11 (which is also referred to as a tenth auxiliary line) passing through the nose ala 45 and the other canthus 144 (which is also referred to as a second canthus) of the aforementioned eye. An intersection point of the auxiliary line L10 and the auxiliary line L8 is the brow head 60a of the eyebrow 60, and an intersection point of the auxiliary line L11 and the auxiliary line L8 is the brow end 60b of the eyebrow 60. Specially, the auxiliary line L8 is a horizontal line passing through the reference point 174, an X-coordinate of the reference point 174 is greater than X-coordinates of the other reference points among the first reference points, while the X-coordinate of a reference point 184 is less than the X-coordinates of the other reference points among the first reference points. In addition, a distance between the canthus 134 and the nose ala 45 is greater than a distance between the canthus 144 and the nose ala 45. In other words, the canthus 134 is relatively closer to the nose, and the canthus 144 is relatively farther from the nose.

Referring to FIG. 6A again, similarly, the display module 127 obtains a height (which is also referred to as a second height) from a reference point P2 (which is also referred to as a fourth reference point) among the second reference points to an auxiliary line L9 (which is also referred to as a seventh auxiliary line). The auxiliary line L9 is a horizontal line passing through a brow head 62a and a brow end 62b of the eyebrow 62, a coordinate (which is referred to as a Y-coordinate) of the reference point P2 in the Y direction (which is also referred to as the first direction) is greater than Y-coordinates of the other reference points among the second reference points. Namely, the reference point P2 is the reference point having the highest position among the second reference points.

In addition, the brow head 62a, the brow end 62b, the auxiliary line L9, the auxiliary line L12 and the auxiliary line L13 may be defined in the same way as the brow head 60a, the brow end 60b, the auxiliary line L8, the auxiliary line L10 and the auxiliary line L11 and thus, will not be repeated hereinafter.

Afterwards, the display module 127 may calculate an average height according to the first height and the second height and display the recommended eyebrow style on positions of the eyebrow 60 and the eyebrow 62 according to the average height. To be more detailed, the display module 127 displays the recommended eyebrow style on a position in the eyebrow 60 with the average height from the auxiliary line L8 and displays the recommended eyebrow style on a position in the eyebrow 62 with the average height from the auxiliary line L9.

Specially, the display module 127 may also determine display positions of a brow head and a brow end of the recommended eyebrow style.

Figure 7A:
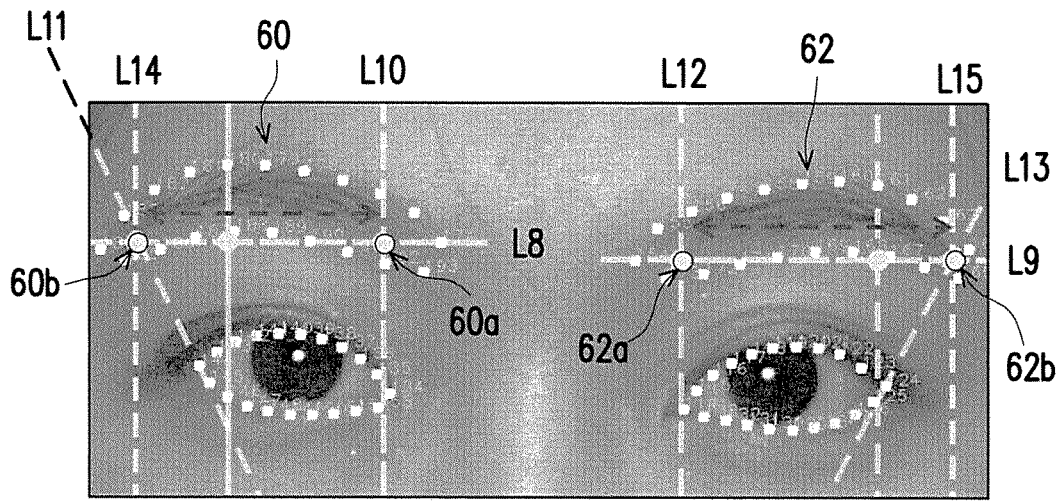
FIG. 7A and FIG. 7B are schematic diagrams of determining a display manner of the recommended eyebrow style according to an embodiment of the invention.
Figure 7A:
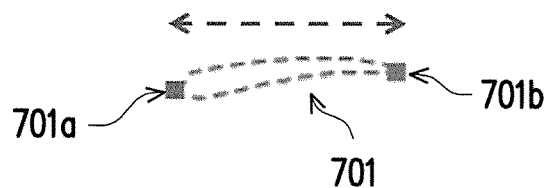
Figure 7B:
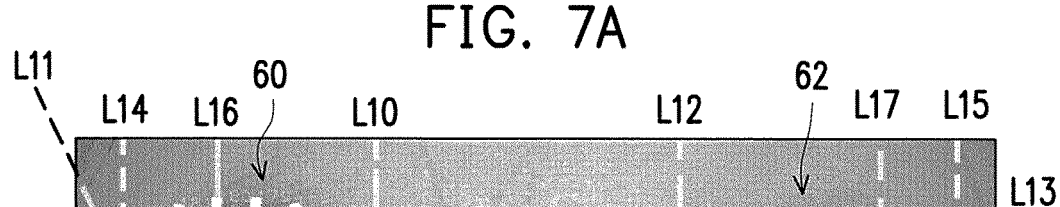
Figure 7B:
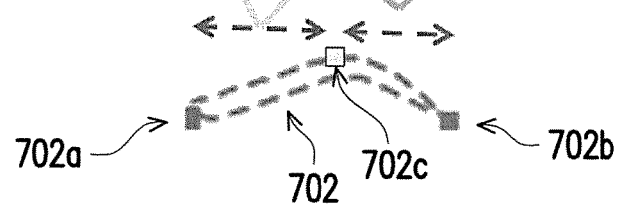

FIG. 7A and FIG. 7B are schematic diagrams of determining a display manner of the recommended eyebrow style according to an embodiment of the invention.

Referring to FIG. 7A, it is assumed that a recommended eyebrow style 701 has only two feature points including a brow head 701a and a brow end 701b, without a feature point of a brow arch. In this circumstance, the display module 127 displays the recommended eyebrow style 701 on a position in the eyebrow 60 with the average height from the auxiliary line L8 and displays the recommended eyebrow style 701 on a position in the eyebrow 62 with the average height from the auxiliary line L9. Specially, the display module 127 also displays the brow head 701a of the recommended eyebrow style 701 on the brow head 60a on the auxiliary line L10 and displays the brow head 701a of the recommended eyebrow style 701 on the brow head 62a on the auxiliary line L12. In addition, the display module 127 also displays the brow end 701b of the recommended eyebrow style 701 respectively on an auxiliary line L14 (which is also referred to as a ninth auxiliary line) and an auxiliary line L15. The auxiliary line L14 is a vertical line passing through the brow end 60b of the eyebrow 60, and the brow end 60b is located on the auxiliary line L11. The auxiliary line L15 is a vertical line passing through the brow end 62b of the eyebrow 62, and the brow end 62b is located on the auxiliary line L13.

It should be noted that the recommended eyebrow style 701 illustrated in FIG. 7A does not have the feature point of the brow arch. However, in the embodiment illustrated in FIG. 7B, a recommended eyebrow style 702 includes a brow head 702a, a brow end 702b and a brow arch 702c. When the recommended eyebrow style 702 is about to be displayed, the display module 127 displays the recommended eyebrow style 702 on a position in the eyebrow 60 with the average height from the auxiliary line L8 and displays the recommended eyebrow style 702 on a position in the eyebrow 62 with the average height from the auxiliary line L9. Specially, the display module 127 displays the brow head 702a of the recommended eyebrow style 702 on the brow head 60a on the auxiliary line L10 and displays the brow head 702a of the recommended eyebrow style 702 on the brow head 62a on the auxiliary line L12. In addition, the display module 127 also displays the brow end 702b of the recommended eyebrow style 702 respectively on the auxiliary line L14 and the auxiliary line L15. Further, the display module 127 also displays the brow arch 702c of the recommended eyebrow style 702 on an auxiliary line L16 (which is also referred to as an eleventh auxiliary line). A ratio of a distance t1 (which is also referred to as a fourth distance) between the auxiliary line L16 and the auxiliary line L10 to a distance t2 (which is also referred to as a fifth distance) between the auxiliary line L16 and the auxiliary line L14 is 2:1. Similarly, the display module 127 also displays the brow arch 702c of the recommended eyebrow style 702 on an auxiliary line L17. A ratio of a distance t3 between the auxiliary line L17 and the auxiliary line L12 to a distance t4 between the auxiliary line L17 and the auxiliary line L15 is 2:1.

Figure 8:
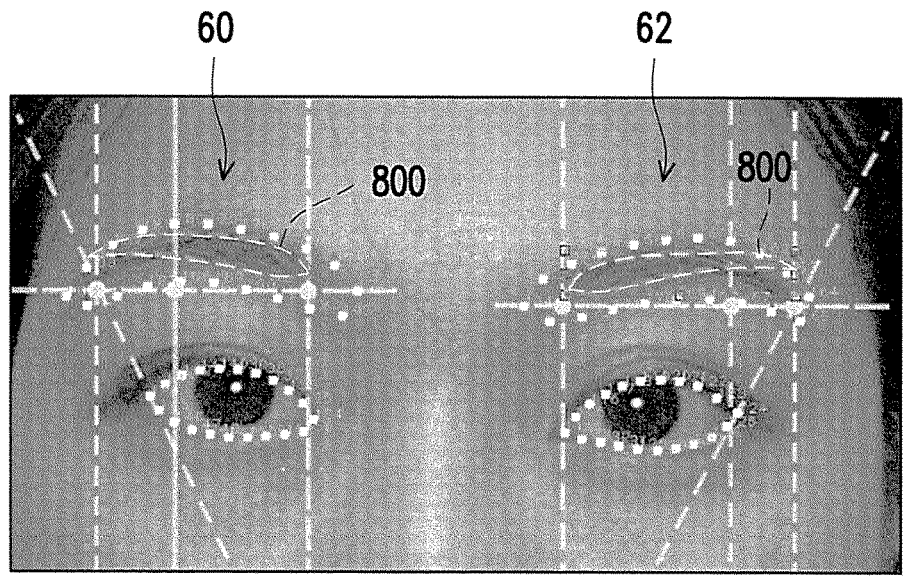
FIG. 8 is a schematic diagram of a display result of displaying the recommended eyebrow style according to an embodiment of the invention.

FIG. 8 is a schematic diagram of a display result of displaying the recommended eyebrow style according to an embodiment of the invention.

Referring to FIG. 8, after the aforementioned steps are performed, the display module 127 may display a recommended eyebrow style 800 respectively on portions of the eyebrow 60 and the eyebrow 62 in the AR. Specially, the recommended eyebrow style 800 may be, for example, the recommended eyebrow style 701 or the recommended eyebrow style 702 as described above. In this way, the user may clearly know a best matched eyebrow style suitable for him/her and how this eyebrow style should be configured in the aforementioned areas of the eyebrows.

Figure 9:
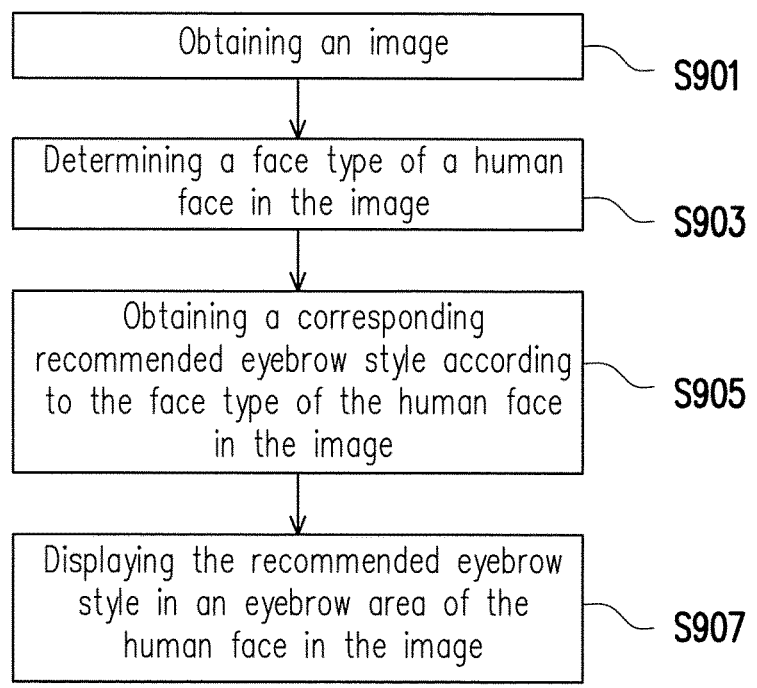
FIG. 9 is a flowchart illustrating a display method for recommending an eyebrow style according to an embodiment of the invention.

FIG. 9 is a flowchart illustrating a display method for recommending an eyebrow style according to an embodiment of the invention.

Referring to FIG. 9, in step S901, the image obtaining module 121 obtains an image. In step S903, the face type determination module 123 determines a face type of a human face in the image. In step S905, the recommended eyebrow style obtaining module 125 obtains a corresponding recommended eyebrow style according the face type of the human face in the image. In step S907, the display module 127 displays the recommended eyebrow style on an eyebrow area of the human face in the image.

In light of the foregoing, in the display method for recommending the eyebrow style, the corresponding recommended eyebrow style may be displayed on the eyebrow area of the human face according to the face type of the human face in the image. Thereby, the user can clearly know the ideal eyebrow style for his/her face type and correspondingly trim his/her eyebrows according to the displayed image, so as to improve efficiency and convenience during the make-up process.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display method for recommending an eyebrow style, comprising:
    obtaining an image;
    determining a face type of a human face in the image according to a ratio based on a distance and a length of a plurality of auxiliary lines;
    obtaining a corresponding recommended eyebrow style according to the face type of the human face in the image; and
    displaying the recommended eyebrow style in an eyebrow area of the human face in the image according to calculated heights from a plurality of reference points to the plurality of auxiliary lines.

2. The display method according to claim 1, wherein the step of determining the face type of the human face in the image comprises:
    obtaining a first distance between a first auxiliary line and a second auxiliary line, wherein the first auxiliary line passes through brow ends of the eyebrows in the eyebrow area, and the second auxiliary line passes through oral commissures of the human face;
    obtaining a first length of a third auxiliary line, wherein the third auxiliary line is tangent to the lower lip of the human face, and two ends of the third auxiliary line respectively terminate in cheeks of the human face; and
    determining the face type of the human face in the image according to the first distance and the first length.

3. The display method according to claim 2, further comprising:
    when a ratio of the first distance to the first length is equal to a first preset value, determining the human face type as an oval shape.

4. The display method according to claim 3, further comprising:
    when the ratio of the first distance to the first length is equal to a second preset value, determining whether an included angle between a tangent line tangent to one of the cheeks of the human face and the cheek is greater than a first threshold;
    when the included angle between the tangent line and the cheek of the human face is greater than the first threshold, determining the human face type as a square shape; and
    when the included angle between the tangent line and the cheek of the human face is not greater than the first threshold, determining the human face type as a round shape.

5. The display method according to claim 4, further comprising:
    when the ratio of the first distance to the first length is neither the first preset value nor the second preset value,
    obtaining a second length of a fourth auxiliary line, wherein the fourth auxiliary line is distant from a hairline of the human face by a second distance, the fourth auxiliary line is distant from the first auxiliary line by a third distance, two ends of the fourth auxiliary line respectively terminate in two sides of the forehead of the human face, and a ratio of the second distance to the third distance is equal to a third preset value;
    obtaining a third length of a fifth auxiliary line, wherein the fifth auxiliary line is tangent to lower edges of the eyes of the human face, and two ends of the fifth auxiliary line respectively terminate in the cheeks of the human face;
    determining whether a ratio of the second length to the third length is equal to a fourth preset value; and
    when the ratio of the second length to the third length is equal to the fourth preset value, determining the human face type as an inverted triangle shape.

6. The display method according to claim 5, further comprising:
    when the ratio of the second length to the third length is equal to a fifth preset value, determining the human face type as a diamond shape; and
    when the ratio of the second length to the third length is neither the fourth preset value nor the fifth preset value, determining the human face type as an oblong shape.

7. The display method according to claim 1, wherein the step of displaying the recommended eyebrow style in the eyebrow area of the human face in the image comprises:
    defining a plurality of first reference points around one of the eyebrows in the eyebrow area;
    defining a plurality of second reference points around the other eyebrow in the eyebrow area;
    obtaining a first height from a third reference point among the first reference points to a sixth auxiliary line, wherein the sixth auxiliary line passes through a brow head and a brow end of the eyebrow, and a coordinate of the third reference point in a first direction is greater than coordinates of the other reference points among the first reference points in the first direction;
    obtaining a second height from a fourth reference point among the second reference points to a seventh auxiliary line, wherein the seventh auxiliary line passes through a brow head and a brow end of the other eyebrow, and a coordinate of the fourth reference point in the first direction is greater than coordinates of the other reference points among the second reference points in the first direction;
    calculating an average height according to the first height and the second height; and
    displaying the recommended eyebrow style in the eyebrow area according to the average height.

8. The display method according to claim 7, wherein the step of displaying the recommended eyebrow style in the eyebrow area of the human face in the image comprises:
    displaying a brow head of the recommended eyebrow style on an eighth auxiliary line, wherein the eighth auxiliary line passes through a nose ala and a first canthus of one of the eyes of the human face; and
    displaying a brow end of the recommended eyebrow style on a ninth auxiliary line, wherein the ninth auxiliary line passes through one of the brow ends of the human face, and the brow end is located on a tenth auxiliary line passing through the nose ala and a second canthus of the eye,
    wherein a distance between the second canthus and the nose ala is greater than a distance between the first canthus and the nose ala.

9. The display method according to claim 8, wherein the step of displaying the recommended eyebrow style in the eyebrow area of the human face in the image further comprises:
displaying a brow arch of the recommended eyebrow style on an eleventh auxiliary line, wherein a ratio of a fourth distance between the eleventh auxiliary line and the eighth auxiliary line to a fifth distance between the eleventh auxiliary line and the ninth auxiliary line is 2:1.

10. An electronic apparatus, comprising:
a storage unit, configured to store a plurality of modules; and
a processing unit, coupled to the storage unit and configured to access and execute the modules stored by the storage unit, wherein the modules comprise:
an image obtaining module, obtaining an image;
a face type determination module, determining a face type of a human face in the image according to a ratio based on a distance and a length of a plurality of auxiliary lines;
a recommended eyebrow style obtaining module, obtaining a corresponding recommended eyebrow style according to the face type of the human face in the image; and
a display module, displaying the recommended eyebrow style in an eyebrow area of the human face in the image according to calculated heights from a plurality of reference points to the plurality of auxiliary lines.

11. The electronic apparatus according to claim 10, wherein in the operation of determining the face type of the human face in the image,
the face type determination module obtains a first distance between a first auxiliary line and a second auxiliary line, wherein the first auxiliary line passes through brow ends of the eyebrows in the eyebrow area, and the second auxiliary line passes through oral commissures of the human face,
the face type determination module obtains a first length of a third auxiliary line, wherein the third auxiliary line is tangent to the lower lip of the human face, and two ends of the third auxiliary line respectively terminate in cheeks of the human face, and
the face type determination module determines the face type of the human face in the image according to the first distance and the first length.

12. The electronic apparatus according to claim 11, wherein
when a ratio of the first distance to the first length is equal to a first preset value, the face type determination module determines the human face type as an oval shape.

13. The electronic apparatus according to claim 12, wherein
when the ratio of the first distance to the first length is equal to a second preset value, the face type determination module determines whether an included angle between a tangent line tangent to one of the cheeks of the human face and the cheek is greater than a first threshold,
when the included angle between the tangent line and the cheek of the human face is greater than the first threshold, the face type determination module determines the human face type as a square shape, and
when the included angle between the tangent line and the cheek of the human face is not greater than the first threshold, the face type determination module determines the human face type as a round shape.

14. The electronic apparatus according to claim 13, further comprising:
when the ratio of the first distance to the first length is neither the first preset value nor the second preset value,
the face type determination module obtains a second length of a fourth auxiliary line, wherein the fourth auxiliary line is distant from a hairline of the human face by a second distance, the fourth auxiliary line is distant from the first auxiliary line by a third distance, two ends of the fourth auxiliary line respectively terminate in two sides of the forehead of the human face, and a ratio of the second distance to the third distance is equal to a third preset value,
the face type determination module obtains a third length of a fifth auxiliary line, wherein the fifth auxiliary line is tangent to lower edges of the eyes of the human face, and two ends of the fifth auxiliary line respectively terminate in the cheeks of the human face,
the face type determination module determines whether a ratio of the second length to the third length is equal to a fourth preset value, and
when the ratio of the second length to the third length is equal to the fourth preset value, the face type determination module determines the human face type as an inverted triangle shape.

15. The electronic apparatus according to claim 14, wherein
when the ratio of the second length to the third length is equal to a fifth preset value, the face type determination module determines the human face type as a diamond shape, and
when the ratio of the second length to the third length is neither the fourth preset value nor the fifth preset value, the face type determination module determines the human face type as an oblong shape.

16. The electronic apparatus according to claim 10, wherein in the operation of displaying the recommended eyebrow style in the eyebrow area of the human face in the image,
the display module defines a plurality of first reference points around one of the eyebrows in the eyebrow area,
the display module defines a plurality of second reference points around the other eyebrow in the eyebrow area,
the display module obtains a first height from a third reference point among the first reference points to a sixth auxiliary line, wherein the sixth auxiliary line passes through a brow head and a brow end of the eyebrow, and a coordinate of the third reference point in a first direction is greater than coordinates of the other reference points among the first reference points in the first direction,
the display module obtains a second height from a fourth reference point among the second reference points to a seventh auxiliary line, wherein the seventh auxiliary line passes through a brow head and a brow end of the other eyebrow, and a coordinate of the fourth reference point in the first direction is greater than coordinates of the other reference points among the second reference points in the first direction,
the display module calculates an average height according to the first height and the second height, and
the display module displays the recommended eyebrow style in the eyebrow area according to the average height.

17. The electronic apparatus according to claim 16, wherein in the operation of displaying the recommended eyebrow style in the eyebrow area of the human face in the image, the display module displays a brow head of the recommended eyebrow style on an eighth auxiliary line, wherein the eighth auxiliary line passes through a nose ala and a first canthus of one of the eyes of the human face, and the display module displays a brow end of the recommended eyebrow style on a ninth auxiliary line, wherein the ninth auxiliary line passes through one of the brow ends of the human face, and the brow end is located on a tenth auxiliary line passing through the nose ala and a second canthus of the eye, wherein a distance between the second canthus and the nose ala is greater than a distance between the first canthus and the nose ala.

18. The electronic apparatus according to claim 17, wherein in the operation of displaying the recommended eyebrow style in the eyebrow area of the human face in the image, the display module displays a brow arch of the recommended eyebrow style on an eleventh auxiliary line, wherein a ratio of a fourth distance between the eleventh auxiliary line and the eighth auxiliary line to a fifth distance between the eleventh auxiliary line and the ninth auxiliary line is 2:1.

\* \* \* \* \*